United States Patent
Das (10) Patent No.: US 9,123,087 B2
(45) Date of Patent: Sep. 1, 2015

(54) SYSTEMS AND METHODS FOR SEGMENTING AN IMAGE

(71) Applicant: Xerox Corporation, Norwalk, CT (US)

(72) Inventor: Apurba Das, West Bengal (IN)

(73) Assignee: Xerox Corporation, Norwalk, CT (US)

( * ) Notice: Subject to any disclaimer, the term of this patent is extended or adjusted under 35 U.S.C. 154(b) by 179 days.

(21) Appl. No.: 13/849,560

(22) Filed: Mar. 25, 2013

(65) Prior Publication Data

US 2014/0286525 A1    Sep. 25, 2014

(51) Int. Cl.
| G06K 9/00 | (2006.01) |
|---|---|
| G06T 9/00 | (2006.01) |
| G06K 9/62 | (2006.01) |
| H04N 19/00 | (2014.01) |

(52) U.S. Cl.
CPC .............. *G06T 9/00* (2013.01); *G06K 9/00456* (2013.01); *G06K 9/6267* (2013.01); *H04N 19/00* (2013.01)

(58) Field of Classification Search
None
See application file for complete search history.

(56) References Cited

U.S. PATENT DOCUMENTS

| 5,548,697 | A |   | 8/1996 | Zortea |  |
|---|---|---|---|---|---|
| 5,765,029 | A | * | 6/1998 | Schweid et al. | 706/52 |
| 6,137,907 | A | * | 10/2000 | Clark et al. | 382/180 |
| 6,163,625 | A | * | 12/2000 | Ng et al. | 382/239 |
| 6,529,633 | B1 | * | 3/2003 | Easwar et al. | 382/239 |
| 6,625,308 | B1 |   | 9/2003 | Acharya et al. |  |
| 7,298,897 | B1 | * | 11/2007 | Dominguez et al. | 382/172 |
| 2001/0019630 | A1 | * | 9/2001 | Johnson | 382/232 |
| 2002/0176632 | A1 | * | 11/2002 | Chrysafis et al. | 382/239 |
| 2004/0146216 | A1 | * | 7/2004 | Andel et al. | 382/277 |
| 2008/0120129 | A1 | * | 5/2008 | Seubert et al. | 705/1 |
| 2008/0175476 | A1 | * | 7/2008 | Ohk et al. | 382/176 |
| 2013/0223732 | A1 | * | 8/2013 | Motoyama | 382/165 |

FOREIGN PATENT DOCUMENTS

EP          1152594 A2 * 11/2001

* cited by examiner

*Primary Examiner* — Utpal Shah
*Assistant Examiner* — Narek Zohrabyan (57) ABSTRACT

A method on a computing device for categorizing one or more blocks of an image is disclosed. The method includes computing a membership value of each of the one or more blocks for each of one or more categories based on a set of parameters associated with each of the one or more blocks. The one or more categories comprise at least an image category. Each of the one or more blocks is categorized in the one or more categories based on the membership value. A category of at least one block is modified to the image category based on a reference signal and the membership value such that the number of blocks categorized under the image category increases.

15 Claims, 8 Drawing Sheets

SYSTEMS AND METHODS FOR SEGMENTING AN IMAGE

TECHNICAL FIELD

The presently disclosed embodiments are related, in general, to image processing. More particularly, the presently disclosed embodiments are related to systems and methods for segmenting an image.

BACKGROUND

An image corresponds to a pictorial representation of an object or a document. The image may be captured by utilizing one or more image capturing devices, such as a camera and/or a scanner. A typical image may include an image portion (e.g., pictures, watermarks, etc.) and/or a non-image portion (e.g., text). Usually, the image portion includes high graphic content that may contribute to a major chunk of storage space required by the image on a storage medium.

In certain scenarios, the image may be transmitted to one or more receivers over a network. Usually, prior to transmitting the image, one or more operations are performed on the image. The one or more operations may include, but are not limited to, reducing the size of the image, watermarking the image for security purpose, etc. Such operations on the image modify the characteristics of both the image portion and the non-image portion. As the non-image portion may include text in the image, operations performed on the image may affect the quality of the text present in the image that may compromise the overall essence of the image.

SUMMARY

According to embodiments illustrated herein there is provided a method implementable on a computing device for categorizing one or more blocks of an image. The method comprising computing a membership value of each of the one or more blocks for each of one or more categories based on a set of parameters associated with each of the one or more blocks. The one or more categories comprise at least an image category. Each of the one or more blocks is categorized in the one or more categories based on the membership value. A category of at least one block is modified to the image category based on a reference signal and the membership value such that the number of blocks categorized under the image category increases. The category is different from the image category.

According to embodiments illustrated herein there is provided a system of categorizing one or more blocks in an image. The system includes a fuzzification module configured to compute a membership value of each of the one or more blocks for each of one or more categories based on a set of parameters associated with each of the one or more blocks. The one or more categories comprise at least an image category. Further, the system includes an image-processing module configured to categorize each of the one or more blocks in the one or more categories based on the membership value. Further, the image-processing module is configured to modify a category of at least one block to the image category based on a reference signal and the membership value such that the number of blocks categorized under the image category increases. The category is different from the image category.

According to embodiments illustrated herein there is provided a computer program product for use with a computer to categorize one or more blocks of an image. The computer program product comprises a set of instructions executable by a processor in the computer. The set of instructions comprising program instruction means for computing a membership value of each of the one or more blocks for each of one or more categories based on a set of parameters associated with each of the one or more blocks. The one or more categories comprise at least an image category. Further, the set of instruction include a program instruction means for categorizing each of the one or more blocks in the one or more categories based on the membership value. Furthermore, the set of instructions include a program instruction means for modifying a category of at least one block to the image category based on a reference signal and the membership value such that the number of blocks categorized under the image category increases, wherein the category is different from the image category.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

An "image" refers to a collection of data, including image data in any format, retained in an electronic form. In an embodiment, the image may correspond to a pictorial representation of an object or a document.

A "block in image" corresponds to a portion in an image that has a predetermined size. Blocks in the image are obtained by segmenting the image using a pixel window of a predetermined size. For example, an 8×8 pixel window would segment the image in a plurality of 8×8 blocks.

The "Size of block" corresponds to a number of pixels in a block. For example, an 8×8 block would encompass 64 pixels.

A "membership function" refers to a set on the universe of X where $\mu:X \rightarrow [0,1]$. Each element of X is mapped to a value between 0 and 1. "$\mu$" is a membership value or a degree of membership that quantifies the grade of membership of the element in X to the membership function.

A "pixel" refers to an element of data that may be provided in any format, color space, or compression state that is associated with or readily convertible into data that can be associated with a small area or spot in an image that is printed or displayed. In an embodiment, a pixel is represented by bits where the number of bits in a pixel is indicative of the information associated with the pixel.

A "compression ratio" refers to a ratio of a size of the original image to a size of the compressed image. For example, when a 2 MB image is compressed to an image having 1 MB size, the compression is 2.

A "Watermark" refers to a design, text or a graphical image that is embedded in a document. In an embodiment, a watermark in a document may be utilized for tracing copyright infringements and authentication.

A "set of parameters" refers to features associated with a block of an image. In an embodiment, the features may include, but are not limited to, color variance, edge strength, and high frequency to low frequency ratio.

A "Multi Function Device" (MFD) refers to a device that can perform multiple functions. Examples of the functions may include, but are not limited to, printing, scanning, copying, faxing, emailing, and the like. In an embodiment, the MFD includes a scanner and a printer for scanning and printing one or more documents respectively. In an embodiment, the MFD has communication capabilities that enable the MFD to send/receive data and messages in accordance with one or more communication protocols such as, but not limited to, FTP, WebDAV, E-Mail, SMB, NFS, and TWAIN.

A "printer" refers to any apparatus, such as a digital copier, bookmaking machine, facsimile machine, multi-function machine (performs scanning, emailing), and the like, which performs a print (original and/or duplicate) outputting function for any purpose in response to digital data sent thereto.

A "print" refers to an image on a medium (such as paper), that is capable of being read directly through human eyes, perhaps with magnification. According to this disclosure, handwritten or partially handwritten image on a medium is considered as an original print. In an embodiment, a duplicate print corresponds to an exact replica of the original print derived by scanning, printing, or both.

Figure 1:
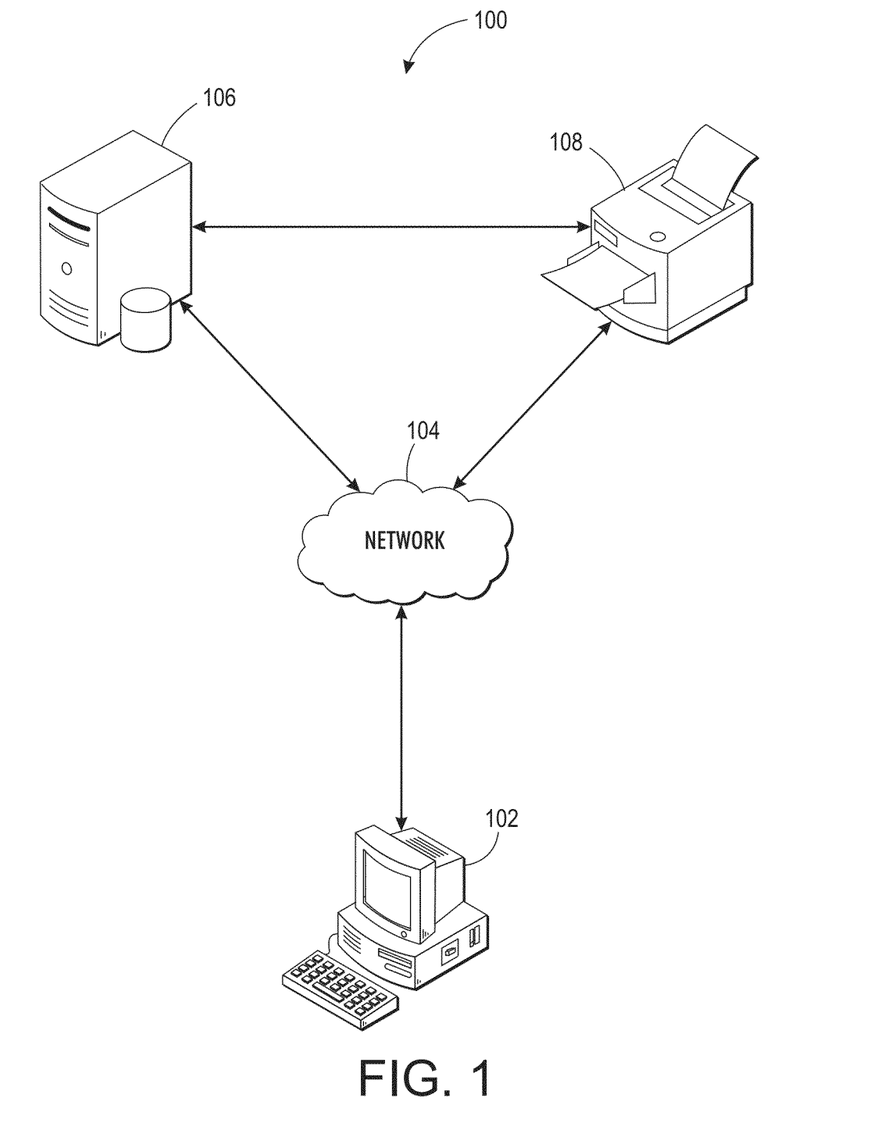
FIG. 1 is a block diagram illustrating a system environment in which various embodiments can be implemented.

FIG. 1 is a block diagram illustrating a system environment 100 in which various embodiments can be implemented. The system environment 100 includes a computing device 102, a network 104, a database server 106, and an MFD 108.

In an embodiment, the computing device 102 receives a first image from at least one of the database server 106 or the MFD 108. In an embodiment, the computing device 102 instructs the MFD 108 to scan a document to generate the first image. Thereafter, the MFD 108 transmits the first image to the computing device 102. In an alternate embodiment, the computing device 102 generates one or more queries to extract the first image from the database server 106. In an embodiment, the computing device 102 automatically generates the one or more queries to extract the first image. The computing device 102 segments the first image in one or more blocks. Thereafter, the computing device 102 categorizes each of the one or more blocks in one or more categories. In an embodiment, the one or more categories include an image category and a non-image category. Further, the computing device 102 modifies a category of at least one block (categorized in non-image category) to the image category. In an embodiment, the computing device 102 modifies the category based on a user input. The categorization of the one or more blocks is described later in conjunction with FIG. 4. Some of the examples of the computing device 102 include a personal computer, a laptop, a PDA, a mobile device, a tablet, or any device that has the capability to receive and process images.

The network 104 corresponds to a medium through which content and messages flow between various devices of the system environment 100 (e.g. the computing device 102, database server 106, and the MFD 108). Examples of the network 104 may include, but are not limited to, a Wireless Fidelity (WI-FI™) network, a Wireless Area Network (WAN), a Local Area Network (LAN) or a Metropolitan Area Network (MAN). Various devices in the system environment 100 can connect to the network 104 in accordance with the various wired and wireless communication protocols such as Transmission Control Protocol and Internet Protocol (TCP/IP), User Datagram Protocol (UDP), and 2G, 3G, or 4G communication protocols.

The database server 106 is configured to store one or more images. In an embodiment, the database server 106 may receive a query from the computing device 102 and/or the MFD 108 to extract the one or more images. The database server 106 may be realized through various technologies, such as, but not limited to, MICROSOFT™ SQL server, ORACLE™, and My SQL. In an embodiment, the computing device 102 and the MFD 108 may connect to the database server 106 using one or more protocols such as, but not limited to, ODBC protocol and JDBC protocol.

In an embodiment, the MFD 108 scans, copies, and prints the one or more images based on the instructions received from the computing device 102. In an embodiment, the MFD 108 transmits the first image to the computing device 102. In another embodiment, the MFD 108 stores the first image in the database server 106. In an embodiment, the MFD 108 stores the scanned image in a local memory of the MFD 108.

Figure 2:
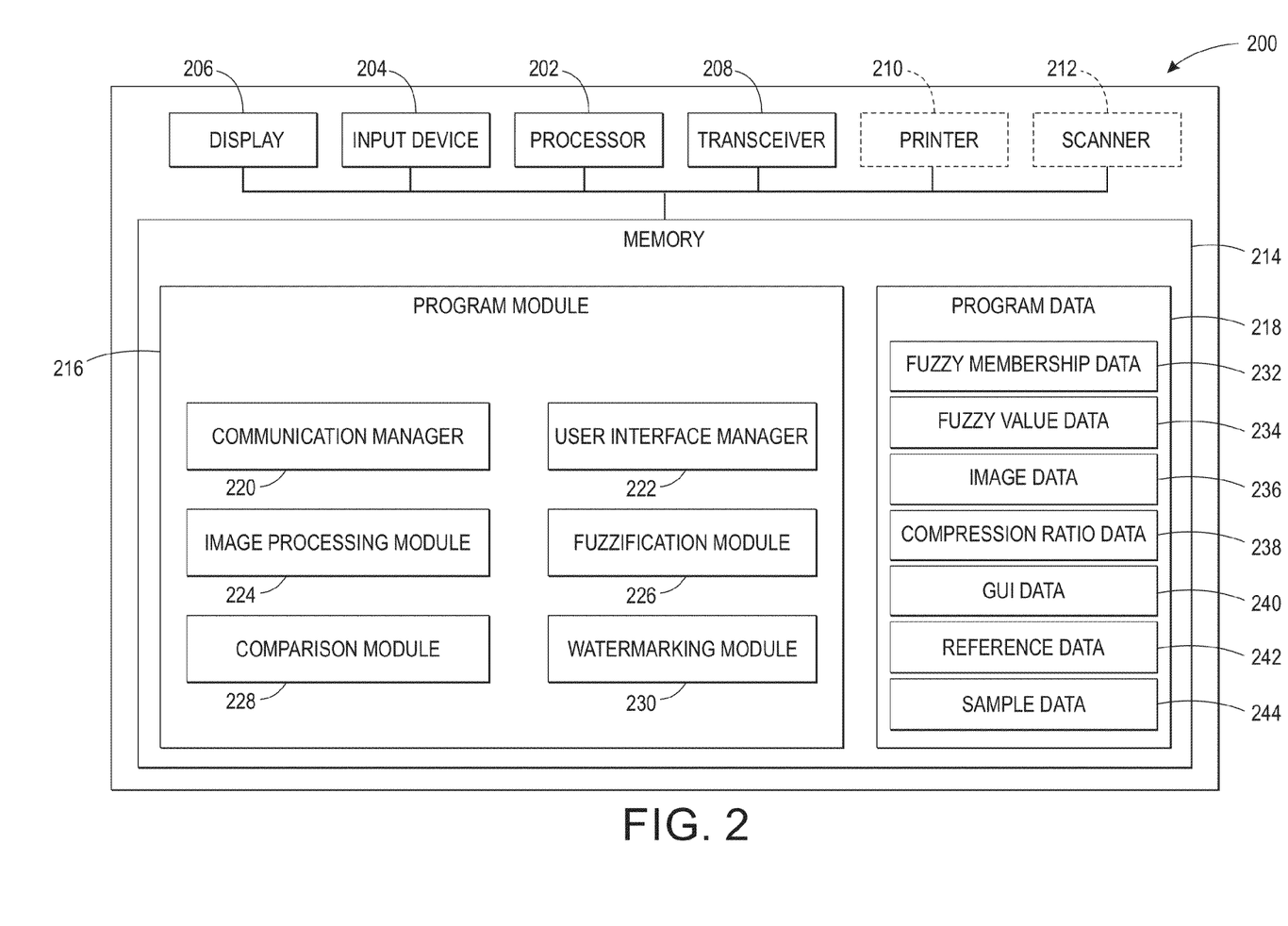
FIG. 2 is a block diagram of a system for categorizing one or more blocks in an image in accordance with at least one embodiment.

FIG. 2 is a block diagram of the system 200 for categorizing one or more blocks in an image in accordance with at least one embodiment. The system 200 is described in conjunction with FIG. 1.

The system 200 includes a processor 202, an input device 204, a display 206, a transceiver 208, and a memory 214. In an embodiment, the system 200 may correspond to the computing device 102 (refer to FIG. 1) and/or the MFD 108. In a scenario where the system 200 corresponds to the MFD 108, the system 200 would further include a printer 210 and a scanner 212. For the purpose of ongoing description, the system 200 has been considered as the computing device 102. However, the scope of the disclosed embodiments should not be limited to the system 200 as being the computing device 102. The system 200 can also be realized as the MFD 108.

The processor 202 is coupled to the input device 204, the display 206, the transceiver 208, and the memory 214. The processor 202 executes a set of instructions stored in the memory 214. The processor 202 can be realized through a number of processor technologies known in the art. Examples of the processor 202 may include, but are not limited to, X86 processor, RISC processor, ASIC processor, CISC processor, ARM processor, or any other processor.

The input device 204 receives an input from a user of the system 200. In an embodiment, a user input may correspond to one or more queries to extract one or more images from the database server 106. In an alternate embodiment, the user input may correspond to one or more instruction to operate the MFD 108, the printer 210, and/or the scanner 212. In yet another embodiment, the user input may correspond to a reference signal. Examples of the input device 204 include, but are not limited to, a mouse, a keyboard, a touch panel, a track-pad, a touch screen, or any other device that has the capability of receiving the user input.

The display 206 displays a user interface to a user of the system 200. The display 206 can be realized through several known technologies, such as, a Cathode Ray Tube (CRT) based display, a Liquid Crystal Display (LCD), a Light Emitting Diode (LED)-based display, an Organic LED display technology, and a Retina Display technology. Further, the display 206 can be a touch screen that receives the user input.

The transceiver 208 transmits and receives messages and data to/from various components of the system environment 100 (e.g. the MFD 108 and the database server 106). Examples of the transceiver 208 may include, but are not limited to, an antenna, an Ethernet port, a USB port or any other port that can be configured to receive and transmit data from external sources. The transceiver 208 transmits and receives data/messages in accordance with the various communication protocols, such as, TCP/IP, UDP, and 2G, 3G, or 4G communication protocols.

In an embodiment, the printer 210 prints the images scanned by the scanner 212. In another embodiment, the printer 210 prints the images received from the database server 106. In an embodiment, the printer 210 may utilize one or more printing technologies, such as, but are not limited to, laser printing, thermal printing, dot matrix printing, and ink-jet printing, to print the images.

In an embodiment, the scanner 212 is an optical device that scans a document to obtain an image of the document. In an embodiment, the scanner 212 may utilize various image capturing techniques such as, but are not limited to, a charge-coupled device (CCD) and a Contact Image Sensor (CIS), to scan the document. In an embodiment, the scanner 212 implements a linear scanning technique. In another embodiment, the scanner 212 implements a two-dimensional scanning technique.

The memory 214 stores a set of instructions and data. Some of the commonly known memory implementations include, but are not limited to, a random access memory (RAM), a read only memory (ROM), a hard disk drive (HDD), and a secure digital (SD) card. Further, the memory 214 includes a program module 216 and a program data 218. The program module 216 includes a set of instructions that is executable by the processor 202 to perform specific operations. The program module 216 further includes a communication manager 220, a user interface manager 222, an image processing module 224, a fuzzification module 226, a comparison module 228, and a watermarking module 230. It is apparent to a person having ordinary skills in the art that the set of instructions stored in the memory 214 enables the hardware of the system 200 to perform the predetermined operation.

The program data 218 includes a fuzzy membership data 232, a fuzzy value data 234, an image data 236, a compression ratio data 238, a GUI data 240, reference data 242, and sample data 244.

In an embodiment, the communication manager 220 receives the first image from the database server 106 through the transceiver 208. In an alternate embodiment, the communication manager 220 receives the first image from the MFD 108. The communication manager 220 stores the first image as the image data 236. Similarly, the communication manager 220 receives a second image from the database server 106 and/or the MFD 108. The communication manager 220 includes various protocol stacks such as, but not limited to, TCP/IP, UDP, and 2G, 3G, or 4G communication protocols. The communication manager 220 transmits and receives the messages/data (e.g., images) through the transceiver 208 in accordance with such protocol stacks.

The user interface manager 222 extracts data from GUI data 240 to display a GUI on the display 206. Further, the user interface manager 222 receives a user input through the input device 204. In a scenario, where the display 206 is a touch screen, the user interface manager 222 receives the user input through the display 206. In an embodiment, the user input corresponds to a reference signal that is indicative of a set point. The user interface manager 222 stores the reference signal as the reference data 242. The GUI and the reference signal will be explained later in conjunction with FIG. 3. In an embodiment, the user interface manager 222 includes one or more drivers to operate the input device 204.

The image processing module 224 segments the first image in one or more blocks using a predefined pixel window. Further, the image processing module 224 categorizes each of the one or more blocks in one or more categories based on a set of parameters associated with each of the one or more blocks. In an embodiment, the one or more categories include an image category and a non-image category. The categorization of the one or more blocks is described later in conjunction with FIG. 4. A person having ordinary skills in the art would understand that scope of the disclosure should not limit to having the image category and the non-image category. In an embodiment, the one or more categories may include a graphics category. Further, the image processing module 224 groups the blocks that are categorized under the same category and are in vicinity of each other to form one or more clusters. Post the categorization, the image processing module 224 modifies the category of at least one block, categorized in the non-image category, to the image category based on the reference signal. In an embodiment, the image processing module 224 compresses the image by compressing the one or more blocks to achieve a first compression ratio. The image processing module 224 stores the first compression ratio as the compression ratio data 238. In an embodiment, the image processing module 224 utilizes one or more image processing techniques, such as, but are not limited to, image subtraction, segmentation, image clustering, Discrete Cosine transform (DCT), and image compression to process the first image.

The fuzzification module 226 defines a membership function for each of the one or more categories. Further, the fuzzification module 226 determines a membership value of each of the one or more blocks for the one or more categories based on the set of parameters associated with the one or more blocks. Determination of membership values is described later in conjunction with FIG. 5. The image processing module 224 categorizes the one or more blocks based on the membership values. The fuzzification module 226 utilizes one or more techniques such as, but is not limited to, hard C-means, fuzzy C-means, and neural network to define the membership functions and to determine the membership values.

The comparison module 228 extracts the first compression ratio from the compression ratio data 238. Further, the comparison module 228 extracts the reference signal from the reference data 242. In an embodiment, the reference signal is indicative of a reference compression ratio. Thereafter, the comparison module 228 compares the first compression ratio with the reference compression ratio to determine whether the desired compression ratio has been achieved. The image processing module 224 modifies the category of the at least one block based on the comparison. In an alternate embodiment, the comparison module 228 compares the size of the blocks categorized under the image category with the size of the second image to generate the comparison data 244. In an embodiment, the comparison module 228 compares the size of the second image with size of the one or more clusters containing blocks categorized in the image category.

The watermarking module 230 embeds the second image on the blocks categorized under the image category. In an embodiment, the watermarking module 230 embeds the second image on at least one of the clusters containing blocks categorized in the image category. In an embodiment, the watermarking module 230 embeds the second image on the blocks categorized under the image category, if the size of the at least one cluster is more than the size of the second image. The embedding of the image is described later in conjunction with FIG. 8.

Figure 3:
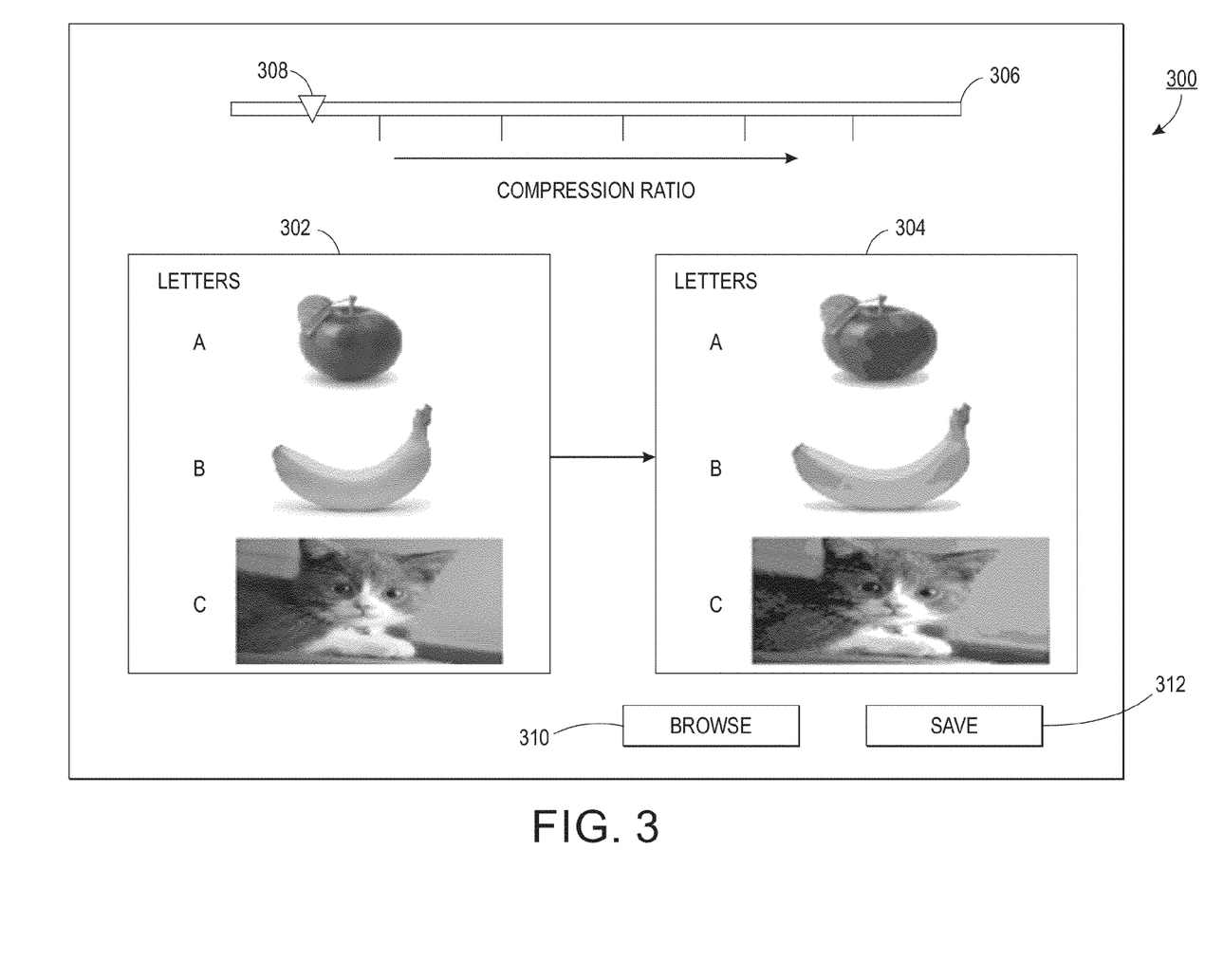
FIG. 3 is a GUI facilitating viewing of the first image and the compressed first image simultaneously in accordance with at least one embodiment.

FIG. 3 is the GUI 300 facilitating viewing of the first image and the compressed first image simultaneously in accordance with at least one embodiment. The GUI 300 is described in conjunction with FIG. 2.

In an embodiment, the user interface manager 222 utilizes GUI data 240 to display the GUI 300. The GUI 300 includes a first area 302, a second area 304, a slide bar 306, a slide button 308, and a first push button 310 and a second push button 312.

The first area 302 is configured to display the first image to a user. The user may slide the slide button 308 along the slide bar 306 to select desired compression ratio. In an embodiment, the slide bar 306 is a scale that displays one or more desired compression ratio ranging from 1 to 10. The second area 304 displays the compressed first image. In an embodiment, the compressed first image is displayed in the second area 304 in real time based on the compression ratio selected from the slide bar 306. In an alternate embodiment, a third push button (not shown) is provided, where the compressed first image is displayed on the second area 304 when the third push button is pressed. The user may use the first push button 310 to browse and select the first image from the one or more images stored in the database server 106. The second push button 312 is used for saving the compressed first image.

A person having ordinary skill in the art would understand that the scope of the disclosure is not limited to the GUI 300 illustrated in FIG. 3. The GUI 300 can be modified based on the user's requirements. For example, the slide bar 306 can be modified to select the required size of the image. In an alternate embodiment, the slide bar 306 can be modified to select a percentage indicating a percentage by which the first image has to be compressed. In an alternate embodiment, the GUI 300 may include an input box (not shown) to input the required compression ratio or the required size of the first image.

Figure 4:
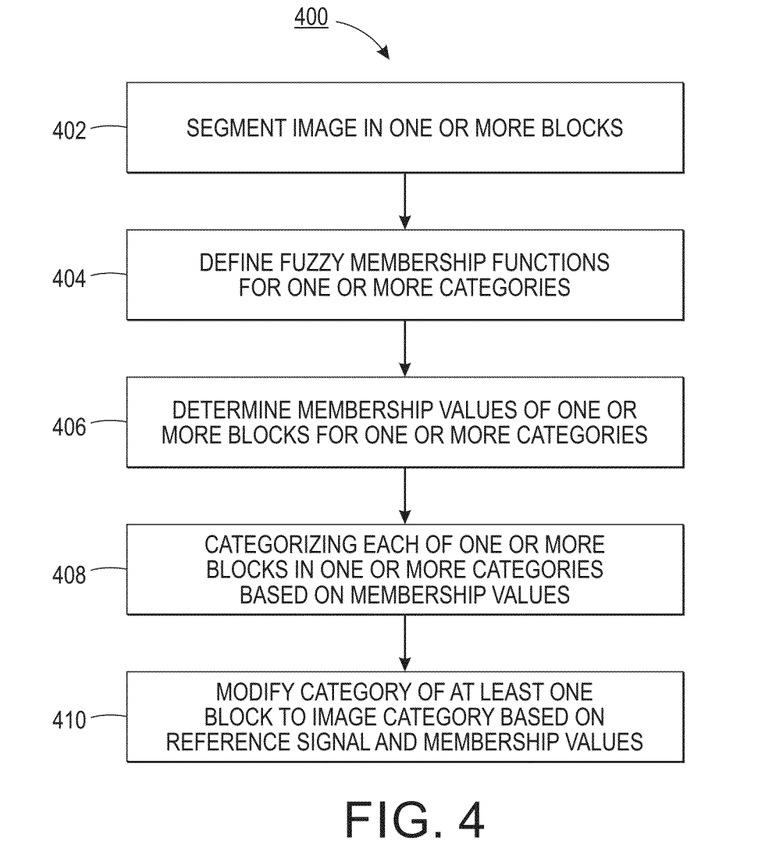
FIG. 4 is a flowchart illustrating a method for categorizing one or more blocks in an image in accordance with at least one embodiment.

FIG. 4 is a flowchart 400 illustrating a method for categorizing the one or more blocks of an image in accordance with at least one embodiment. The flowchart 400 is described in conjunction with FIG. 1, FIG. 2, and FIG. 3.

At step 402, the first image is segmented in one or more blocks. In an embodiment, the image processing module 224 segments the first image. Prior to the segmentation, the system 200 obtains the first image from the database server 106. In an alternate embodiment, the system 200 instructs the MFD 108 to scan a document to generate the first image. Thereafter, the communication manager 220 receives the first image (i.e., a scanned copy of the document) from the MFD 108. The communication manager 220 stores the first image as the image data 236. In an embodiment, the first image includes a text portion and an image portion. The image processing module 224 extracts the first image from the image data 236. Thereafter, the image processing module 224 utilizes a predefined pixel window to segment the first image in the one or more blocks. For example, the first image has a resolution of 800×600 pixels. The image processing module 224 utilizes a 8×8 pixel window to segment the first image into the one or more blocks, each having a size of 8×8 pixels.

At step 404, a fuzzy membership function is defined for each of the one or more categories in which the one or more blocks have to be categorized. In an embodiment, the fuzzification module 226 defines the fuzzy membership function for each of the one or more categories. In an embodiment, the one or more categories include an image category and a non-image category. In order to define the fuzzy membership function, the fuzzification module 226 extracts a sample image data from the sample data 244. In an embodiment, the sample image data includes one or more image blocks that are pre-categorized in the image category and the non-image category. The fuzzification module 226 analyzes the set of parameters associated with each of the pre-categorized one or more image blocks in the sample data 244 to identify a threshold value of the set of parameters. In an embodiment, the threshold value indicates transition between the membership functions for the non-image category and the image category.

For example, the sample data 244 includes 10 image blocks of which 6 image blocks are pre-categorized in the image category and 4 image blocks are pre-categorized under the non-image category. The edge strength for the 10 image blocks varies from 0 to 1. The fuzzification module 226 computes an entropy of the edge strength for the 4 image blocks (categorized under the non-image category) and the 6 image blocks (categorized under the image category). Thereafter, the fuzzification module 226 determines edge strength of an image block from the 10 image blocks that has minimum entropy. In an embodiment, the edge strength of the image block having minimum entropy is the threshold value.

A person having ordinary skill in the art would understand that the scope of the disclosure is not limited to defining the membership function based on the entropy of the set of parameters. In an embodiment, the fuzzification module 226 may utilize one or more techniques such as, but are not limited to, genetic algorithms, neural network, and inductive reasoning to define the membership function.

At step 406, membership value for each of the one or more blocks is determined based on the set of parameters associated with the one or more blocks. In an embodiment, the fuzzification module 226 computes the membership value for each of the one or more blocks. The fuzzification module 226 stores the membership values as the fuzzification value data 234. The computation of the membership function is described later in conjunction with FIG. 5.

At step 408, the one or more blocks are categorized in the one or more categories based on the membership value associated with the one or more blocks. In an embodiment, the image processing module 224 categorizes the one or more blocks. In order to categorize a block, the image processing module 224 extracts the membership values of the block for the image category and the non-image category from the fuzzification value data 234. Based on the membership value, the block is categorized in the image category or the non-image category. For example, the block has a membership value of 0.7 for the non-image category and 0.3 for the image category. The image processing module 224 will categorize the block in the image category. After the categorization of the one or more blocks, the image processing module 224 groups the blocks that are categorized in the same category and are in the vicinity of each other to generate the one or more clusters. For example, the image category includes a 20 blocks. Out of the 20 blocks, the 12 blocks are in the vicinity of each other. The image processing module 224 would group the 12 blocks to generate a cluster. In an embodiment, the image processing module 224 will create a boundary encompassing the 12 blocks in the first image. The categorization of the image blocks is described later in conjunction with FIG. 6.

At step 410, the category of at least one block, categorized under the non-image category, is modified to the image category. In an embodiment, the image processing module 224 modifies the category of the at least one block based on the membership value associated with the at least one block. For example, a block, categorized under the non-image category, has a membership value of 0.6 in the non-image category and 0.4 in the image category. In an embodiment, the image processing module 224 will modify the category of the block from the non-image category to the image category. In an embodiment, the category of the blocks, having membership values in the range of 0.50-0.65 in the non-image category and the membership values in the range of 0.35-0.50 in the image category, is modified. The modifying of the category is described later in conjunction with FIG. 6.

Figure 5:
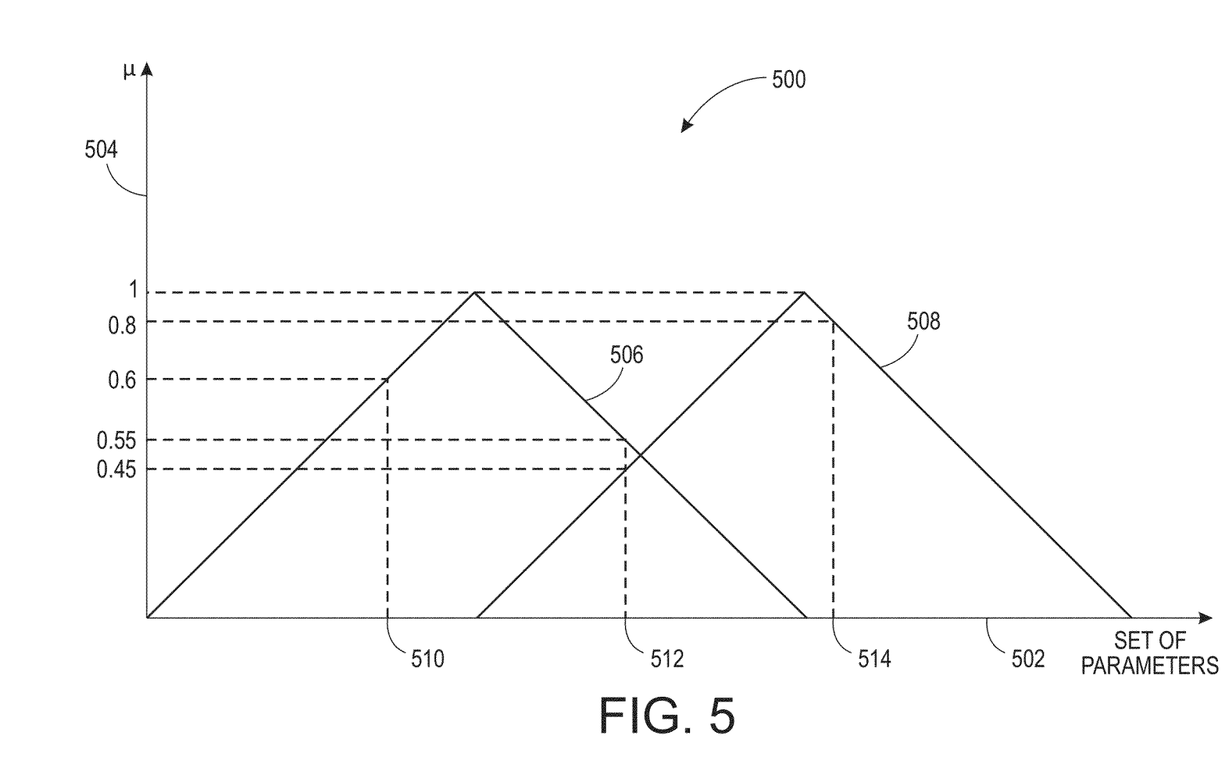
FIG. 5 is a graphical representation of membership function of the one or more categories in accordance with at least one embodiment.

FIG. 5 is a graphical representation 500 of the membership functions for the one or more categories in accordance with the at least one embodiment. The graphical representation 500 is described in conjunction with FIG. 4.

The graphical representation 500 includes a first curve 506 indicating a first membership function for the non-image category and a second curve 508 indicating a second membership function for the image category. The first curve 506 and the second curve 508 are plotted against values of the set of parameters (depicted by 504) and membership value (depicted by 502).

For example, an image block has a set of parameters as depicted by 510, the image block will have a membership value of 0.6 in the first membership function (i.e., the non-image category). Similarly, for an image block that has a set of parameters as depicted by 514 will have a membership value of 0.8 in the second membership function (i.e., the image category). For the image block, that has a set of parameter as depicted 512 will have a membership value of 0.55 and 0.45 in the first membership function and the second membership function, respectively.

Figure 6:
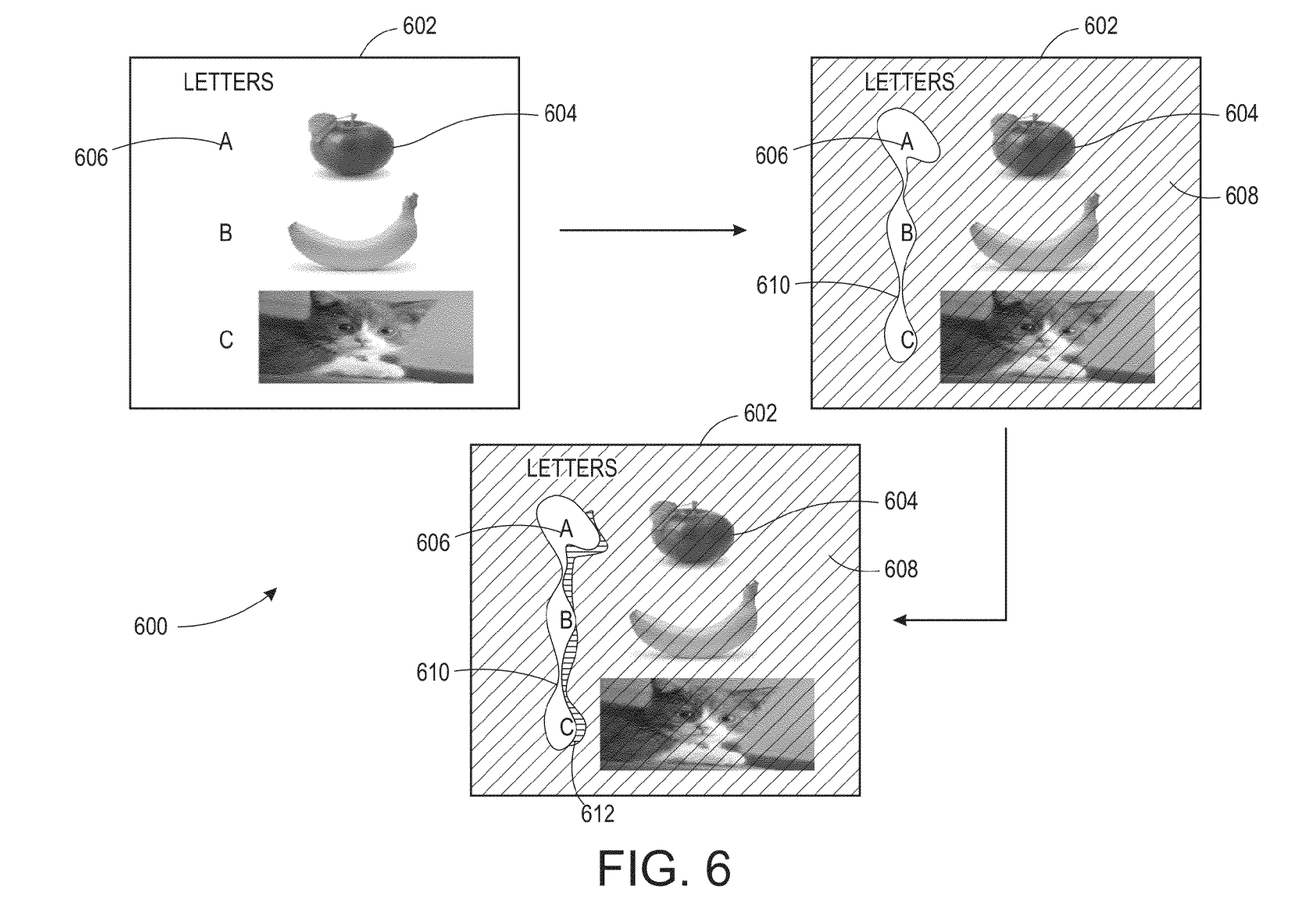
FIG. 6 is a series of snapshots of an electronic document illustrating categorization of the one or more blocks in accordance with at least one embodiment.

FIG. 6 is a series of snapshots 600 of an electronic document illustrating the categorization of the one or more blocks in accordance with at least one embodiment. FIG. 6 is described in conjunction with FIG. 4.

The series of snapshots 600 includes an electronic document 602 containing a text portion (depicted by 606) and an image portion (depicted by 604). Firstly, the image processing module 224 segments the image in one or more blocks as described in step 402. For each of the one or more blocks, the fuzzification module 226 determines a membership values based on a set of parameters associated with each of the one or more blocks (described in step 406). In an embodiment, the membership value for the blocks encompassing the text portion 606 will be different from the membership value for the blocks encompassing the image portion 604. In an embodiment, the blocks encompassing the image portion 604 will have high membership values for the second membership function (i.e., membership function of the image category). Similarly, the blocks encompassing the text portion 606 will have high membership value for the first membership function (i.e., membership function of the non-image category).

Based on the membership values, the image processing module 224 categorizes each of the one or more blocks in the image category and the non-image category (described in step 408). Further, the image processing module 224 groups the blocks that are categorized in the same category and are in vicinity of each other to generate a cluster. The boundary 608 encompasses the blocks categorized under the image category and the boundary 610 encompasses the blocks categorized under the non-image category.

For the blocks that have been categorized under the non-image category and that have membership values close to the image category are moved to the image category. For example, a block categorized in non-image category has a membership values of 0.55 and 0.45 in the first membership function (depicted by the first curve 506) and the second membership function (depicted by the first curve 508), respectively. The category of such blocks is modified to the image category to increase the total number of blocks in the image category. The boundary 608 is modified to include such blocks that were previously categorized under the non-image category (depicted by shaded region 612).

Figure 7:
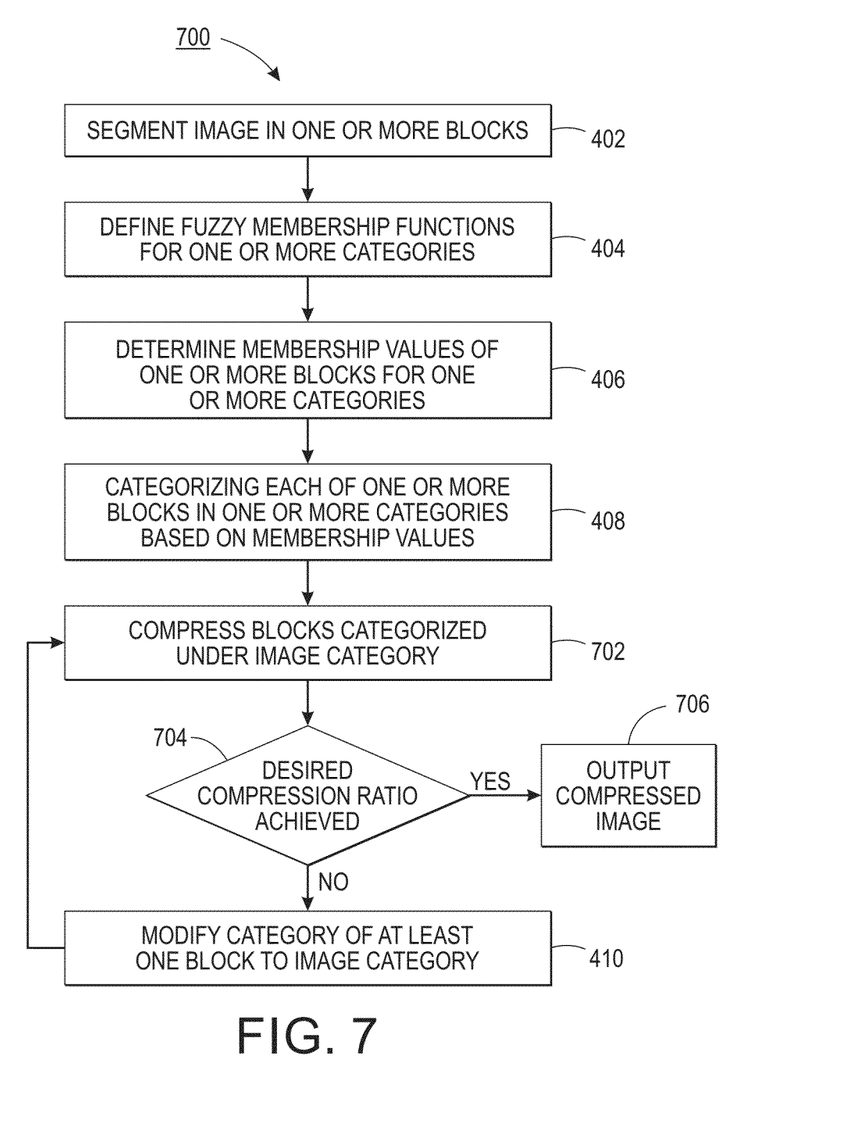
FIG. 7 is a flowchart illustrating a method for compressing an image in accordance with at least one embodiment.

FIG. 7 is a flowchart 700 illustrating a method for compressing an image in accordance with at least one embodiment. The flowchart 700 is described in conjunction with FIG. 1, FIG. 2, FIG. 3, FIG. 4, FIG. 5, and FIG. 6.

At step 402, the first image is segmented into the one or more blocks. Prior to segmenting the first image, the system 200 receives the first image from the MFD 108 and/or the database server 106. The user interface manager 222 displays the first image in the first area 302 of the GUI 300.

Steps 404-408 are performed as described in conjunction with the flowchart 400.

At step 702, the first image is compressed. In an embodiment, the image processing module 224 compresses the first image. The image processing module 224 compresses the blocks categorized under the image category separately from the blocks categorized under the non-image category. In an embodiment, the image processing module 224 utilizes a lossy compression technique to compress the block categorized under the image category. Further, the image processing module 224 utilizes a lossless compression technique to compress the blocks categorized under the non-image category. The image processing module 224 compresses the first image to achieve the first compression ratio.

At step 704, a check is performed whether a desired compression ratio has been achieved. In an embodiment, the comparison module 228 performs the check. Prior to the check, the user interface manager 222 receives the user input indicative of a reference signal or the desired compression ratio. In an embodiment, the user of the system 200 selects the desired compression ratio by moving the slide button 308 on the slide bar 306 to the desired location. In an embodiment, the position of the slide button 308 on the slide bar 306 is indicative of the desired compression ratio. The user interface manager 222 stores the desired compression ratio as the reference data 242. The comparison module 228 extracts the desired compression ratio from the reference data 242. Thereafter, the comparison module 228 compares the first compression ratio with the desired compression ratio.

If at step 704 it is determined that the first compression ratio is not equal to the desired compression ratio, step 410 is performed. At step 410, the category of the blocks, categorized under the non-image category, is modified to the image category (described in conjunction with the flowchart 400). In an embodiment, the number of blocks for which the category has to be modified is determined based on a difference between the first compression ratio and the desired compression ratio. The difference is looked up in an index or a look-up table to determine the number of blocks for which the category has to be modified. Following is an example look-up table:

TABLE 1

A look-up table to determine number of blocks based on the difference.

| Difference between the first compression ratio and the desired compression ratio | Number of blocks |
|---|---|
| 0.1 | 10 |
| 0.5 | 50 |
| 1 | 100 |
| 2 | 200 |
| 2.5 | 250 |

Thereafter, step 702 is repeated until the first compression ratio is equal to the desired compression ratio.

A person having ordinary skills in the art would understand that the scope of the disclosure should not be limited to determining the number of blocks based on the look-up table. In an embodiment, the number of blocks is determined based on a relative occupancy of the blocks in the image category to that of the blocks in the non-image category.

If at step 704 it is determined that the first compression ratio is equal to the desired compression ratio, the compressed first image is outputted. In an embodiment, the user interface manager 222 outputs the compressed first image through the GUI 300. In an embodiment, the compressed first image is displayed in the second area 304 of the GUI 300.

Modifying the category of the blocks categorized in the non-image category to the image category increases the total number of the blocks categorized in the image category. As total number of blocks in the image category increases, number of blocks on which lossy compression technique can be used also increases. High compression ratio can be achieved.

Figure 8:
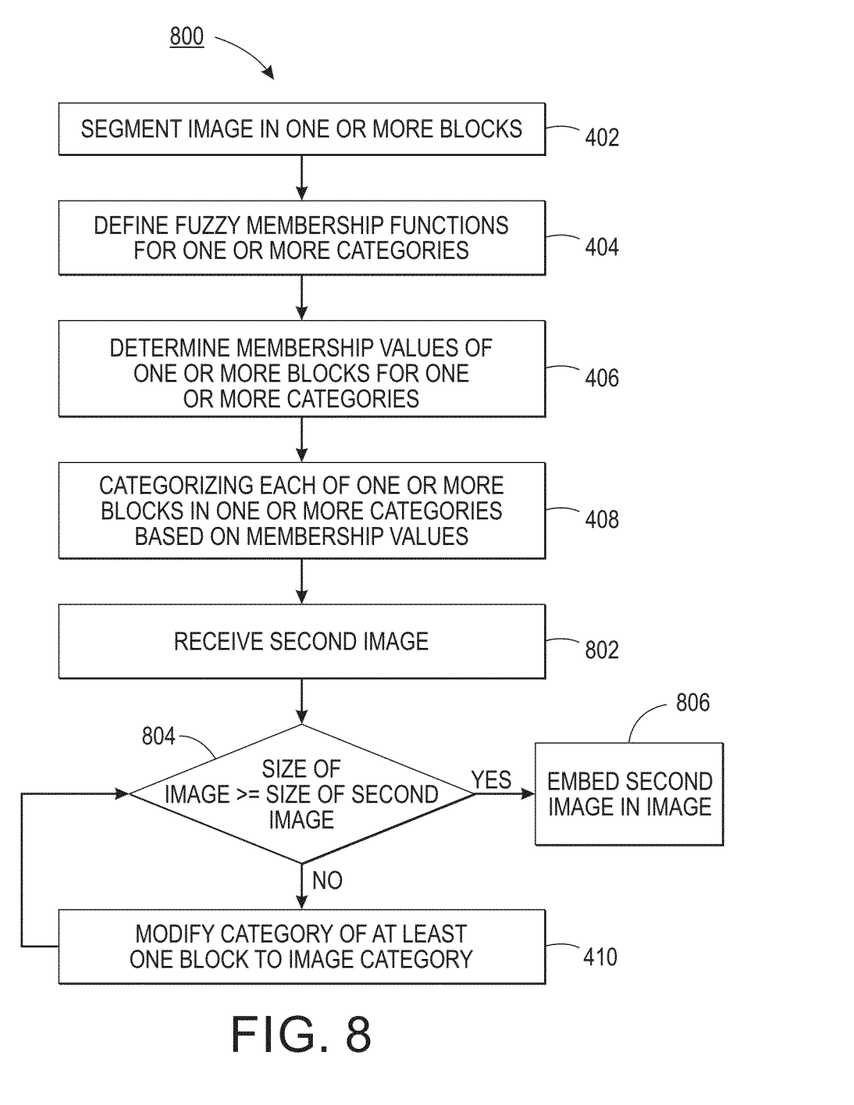
FIG. 8 is a flowchart illustrating a method for embedding a second image in a first image in accordance with at least one embodiment.

FIG. 8 is a flowchart 800 illustrating a method for embedding a second image in a first image in accordance with at least one embodiment. In an embodiment, the second image is a watermark image.

At step 802, the system 200 receives the second image from the database server 106 and/or the MFD 108. In an embodiment, the system 200 receives the second image in a similar manner as the first image is received.

At step 804, a check is performed whether a size of blocks categorized under the image category is greater than the size of the second image. In an embodiment, the comparison module 228 performs the check.

In an embodiment, the comparison module 228 instructs the image processing module 224 to determine a discrete cosine transform (DCT) of the blocks categorized in the image category. Thereafter, the comparison module 228 determines a space in each of the blocks (in the image category) that lies in mid-frequency DCT coefficient range. The comparison module 228 compares the space with the size of the second image (in terms of bits).

At step 410, the category of the blocks, categorized under the non-image category, is modified to the image category (described in conjunction with the flowchart 400). Thereafter, the step 804 is repeated until the size of the blocks in the image category becomes greater than the size of the second image.

If at step 804 it is determined that, the size of the blocks categorized under the image category is greater than the size of the second image, step 806 is performed. At step 806, the second image is embedded onto the blocks categorized under the image category. In an embodiment, the watermarking module 230 embeds the second image on the blocks categorized under the image category.

The disclosed embodiments encompass numerous advantages. A membership value of each of the one or more blocks for the one or more categories is computed. Based on the membership value the one or more blocks are categorized. Further, the based on the membership value, the category of a block can be modified. For example, the blocks from the non-image category are moved to the image category. Thus, total number of blocks categorized under the image category increases. As a lossy compression technique is used for compressing the box in the image category, higher compression ratio can be achieved. Additionally, the increase in number of blocks in the image category allows bigger images or watermarks to be embedded in the image.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the systems and methods for segmenting an image have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method implementable on a computing device for categorizing one or more blocks of an image, the method comprising:
    computing a membership value of each of the one or more blocks for each of one or more categories based on a set of parameters associated with each of the one or more blocks, wherein the one or more categories comprise at least an image category;
    categorizing each of the one or more blocks in the one or more categories based on the membership value;
    compressing blocks categorized under the image category to achieve a first compression ratio;
    comparing the first compression ratio with a reference compression ratio to generate a reference signal, wherein the reference signal corresponds to a difference between the first compression ratio and the reference compression ratio;
    modifying a category of a set of blocks to the image category based on the reference signal and the membership value such that the number of blocks categorized under the image category increases, wherein the category is different from the image category, wherein a predefined number of blocks, categorized in the category, are included in the set of blocks, and wherein the predefined number of blocks is determined based on the reference signal.

2. The method of claim 1, wherein the set of parameters comprises a color variance, a measure of edge strength, and a high frequency to low frequency ratio.

3. The method of claim 1 further comprising defining a fuzzy membership function for each of the one or more categories.

4. The method of claim 1, wherein the reference signal is deterministic of the number of blocks categorized under the image category.

5. The method of claim 1 further comprising compressing the blocks categorized under the image category to achieve a first compression ratio.

6. The method of claim 5, wherein a lossy compression technique is utilized for compressing the blocks categorized under the image category.

7. The method of claim 1, wherein the one or more categories comprise the image category, a non-image category, and a mixed category.

8. A method implementable on a computing device for compressing an image, the image comprising one or more blocks, the method comprising:
    categorizing each of the one or more blocks in one or more categories based on a set of parameters associated with each of the one or more blocks, the one or more categories comprising at least a first category;
    compressing blocks categorized under the first category to achieve a first compression ratio; and
    comparing the first compression ratio with a reference compression ratio, wherein a category of a set of blocks is modified to the first category based on the comparison, wherein the set of blocks is compressed to achieve the reference compression ratio, wherein a predefined number of blocks, categorized in the category, are included in the set of blocks, and wherein the predefined number of blocks is determined based on the reference compression ratio.

9. The method of claim 8 further comprising defining a fuzzy membership function for each of the one or more categories.

10. The method of claim 9 further comprising computing a membership value of each of the one or more blocks for each of the one or more categories based on the set of parameters, wherein the one or more blocks are categorized based on the membership value.

11. The method of claim 8, wherein the image corresponds to at least an electronic document.

12. The method of claim 8, wherein the set of parameters comprises a color variance, a measure of edge strength, and a high frequency to low frequency ratio.

13. A system of categorizing one or more blocks in an image, the system comprising:
one or more processors configured to:
compute a membership value of each of the one or more blocks for each of one or more categories based on a set of parameters associated with each of the one or more blocks, wherein the one or more categories comprise at least an image category;
categorize each of the one or more blocks in the one or more categories based on the membership value;
compress the blocks categorized under the image category to achieve a first compression ratio;
compare the first compression ratio with a reference compression ratio to generate a reference signal, wherein the reference signal corresponds to a difference between the first compression ratio and the reference compression ratio; and
modify a category of a set of blocks to the image category based on the reference signal and the membership value such that the number of blocks categorized under the image category increases, wherein the category is different from the image category, wherein a predefined number of blocks, categorized in the category, are included in the set of blocks, and wherein the predefined number of blocks is determined based on the reference signal.

14. The system of claim 13, wherein the one or more processors are further configured to define a fuzzy membership function for each of the one or more categories.

15. A non-transitory computer program product for use with a computer to categorize one or more blocks of an image, the non-transitory computer program product comprises a set of instructions executable by a processor to:
compute a membership value of each of the one or more blocks for each of one or more categories based on a set of parameters associated with each of the one or more blocks, wherein the one or more categories comprise at least an image category;
categorize each of the one or more blocks in the one or more categories based on the membership value;
compress the blocks categorized under the image category to achieve a first compression ratio;
compare the first compression ratio with a reference compression ratio to generate a reference signal, wherein the reference signal corresponds to a difference between the first compression ratio and the reference compression ratio; and
modify a category of a set of blocks to the image category based on a reference signal and the membership value such that the number of blocks categorized under the image category increases, wherein the category is different from the image category, wherein a predefined number of blocks, categorized in the category, are included in the set of blocks, and wherein the predefined number of blocks is determined based on the reference signal.

* * * * *